United States Patent
Ando et al.

(10) Patent No.: US 9,656,664 B2
(45) Date of Patent: May 23, 2017

(54) HYBRID VEHICLE CONTROL DEVICE

(71) Applicant: Nissan Motor Co., Ltd., Yokohama-shi, Kanagawa (JP)

(72) Inventors: Takao Ando, Kanagawa (JP); Ryosuke Ito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/917,058

(22) PCT Filed: Oct. 4, 2013

(86) PCT No.: PCT/JP2013/077184
§ 371 (c)(1),
(2) Date: Mar. 7, 2016

(87) PCT Pub. No.: WO2015/049806
PCT Pub. Date: Apr. 9, 2015

(65) Prior Publication Data
US 2016/0193994 A1 Jul. 7, 2016

(51) Int. Cl.
*B60W 20/30* (2016.01)
*B60W 10/10* (2012.01)
(Continued)

(52) U.S. Cl.
CPC ............ *B60W 20/30* (2013.01); *B60K 6/48* (2013.01); *B60K 6/543* (2013.01); *B60K 6/547* (2013.01);
(Continued)

(58) Field of Classification Search
CPC ...... B60W 20/30; B60W 10/10; B60W 20/40; B60W 10/02; B60W 10/06; B60W 10/08;
(Continued)

(56) References Cited

U.S. PATENT DOCUMENTS 9,205,834 B1 * 12/2015 Uehara .................. B60W 20/50
9,315,189 B2 * 4/2016 Mould .................. B60W 10/08
(Continued)

FOREIGN PATENT DOCUMENTS

EP        0 922 600 A2    6/1999
JP        2009-234292 A   10/2009
(Continued)

OTHER PUBLICATIONS

Komuro et al., JP2012245833, Dec. 13, 2012 (Machine Translation).*
Imai et al., JP2009292321, Dec. 17, 2009 (Machine Translation).*

*Primary Examiner* — Courtney Heinle
(74) *Attorney, Agent, or Firm* — Global IP Counselors, LLP

(57) ABSTRACT

A hybrid vehicle control device for a drive system is provided with an engine, a motor and an automatic transmission. The hybrid vehicle control device is configured such that when there is a mode switch request during an EV mode where only the motor is used as a drive source, a shift is made to an HEV mode where the engine and the motor are used as drive sources. The hybrid vehicle control device is further configured such that if a mode switch request and a downshift request for the automatic transmission (are generated, mode switch control is immediately started first. The configuration is also such that downshift control is started once the rotational speed of the engine has reached a combustion possible rotational speed, and the transmission speed at this time is made to be faster than an ordinary transmission speed.

16 Claims, 6 Drawing Sheets

(51) Int. Cl.
*B60W 20/40* (2016.01)
*B60W 10/02* (2006.01)
*B60W 10/06* (2006.01)
*B60W 10/08* (2006.01)
*B60W 10/11* (2012.01)
*B60W 20/10* (2016.01)
*B60W 20/20* (2016.01)
*B60K 6/543* (2007.10)
*B60K 6/48* (2007.10)
*B60K 6/547* (2007.10)
*B60W 20/19* (2016.01)

(52) U.S. Cl.
CPC ............ *B60W 10/02* (2013.01); *B60W 10/06* (2013.01); *B60W 10/08* (2013.01); *B60W 10/10* (2013.01); *B60W 10/11* (2013.01); *B60W 20/10* (2013.01); *B60W 20/19* (2016.01); *B60W 20/20* (2013.01); *B60W 20/40* (2013.01); *B60W 2400/00* (2013.01); *B60W 2510/0208* (2013.01); *B60W 2520/10* (2013.01); *B60W 2540/10* (2013.01); *B60W 2710/1005* (2013.01); *B60W 2720/10* (2013.01); *Y02T 10/6221* (2013.01); *Y10S 903/93* (2013.01)

(58) Field of Classification Search
CPC ...... B60W 10/11; B60W 20/10; B60W 20/20; B60W 2400/00; B60W 2520/10; B60W 2540/10; B60W 2710/1005; B60W 2720/10; B60W 20/19; B60K 6/48; B60K 6/547; B60K 6/543; Y02T 10/6221; Y02T 903/93; Y10S 903/93
See application file for complete search history.

(56) References Cited

U.S. PATENT DOCUMENTS

2013/0138309 A1* 5/2013 Kabe ...................... F16H 61/66
　　　　　　　　　　　　　　　　　　701/58
2016/0221576 A1* 8/2016 Wang ................... B60W 30/14

FOREIGN PATENT DOCUMENTS

| | | |
|---|---|---|
| JP | 2009-292321 A | 12/2009 |
| JP | 2012-245833 A | 12/2012 |
| JP | 2013-113346 A | 6/2013 |

* cited by examiner

HYBRID VEHICLE CONTROL DEVICE

CROSS-REFERENCE TO RELATED APPLICATIONS

This application is a U.S. National stage application of International Application No. PCT/JP2013/077184, filed Oct. 4, 2013.

BACKGROUND

Field of the Invention

The present invention relates to a hybrid vehicle control device upon a generation of a mode switch request from an electric vehicle traveling mode to a hybrid vehicle traveling mode, and a downshift request of the automatic transmission.

Background Information

Conventionally, a hybrid vehicle control device is known in which, if a transmission request and a mode switch request from an electric vehicle traveling mode to a hybrid vehicle traveling mode are generated, a mode switch control is started first, then a transmission control of the automatic transmission is started after fuel injection and ignition of the engine is ended and engine start is completed (for example refer to Japanese Laid Open Patent Application No. 2009-234292).

SUMMARY

However, in the conventional hybrid vehicle control device, transmission control is started after waiting for the completion of engine start, but the transmission speed at this time is not at all considered. Consequently, there is a problem that the timing of transmission completion is delayed compared to when starting transmission control at the same time as a transmission request. In view of the problem described above, an object of the present invention is to provide a hybrid vehicle control device that is able to prevent a delay in transmission response when a mode switch request and a downshift request are generated.

In order to achieve the object described above, the present invention is equipped with a cooperative control means, in a hybrid vehicle control device in which an engine, a first clutch, a motor, and an automatic transmission are provided to a drive system, and in which when there is a mode switch request during an electric vehicle traveling mode where the first clutch is released and only the motor is a drive source, the engine is started and the first clutch is engaged, and a shift is made to a hybrid vehicle traveling mode where the engine and the motor are drive sources. If the mode switch request and a downshift request for the automatic transmission are generated, the cooperative control means immediately starts a mode switch control. Then, downshift control is started once the rotational speed of the engine has reached a combustion possible rotational speed. Furthermore, this cooperative control means comprises a transmission speed control section which sets the transmission speed to be faster during a downshift control when the mode switch request and the downshift request for the automatic transmission are generated, than the transmission speed during a downshift control when only the downshift request of the automatic transmission is generated.

Therefore, in the hybrid vehicle control device of the present invention, in a downshift control that is started once the rotation speed of the engine has reached a combustion possible rotational speed, the transmission speed at this time is made to be faster than the transmission speed during a downshift control when only a downshift request is generated. That is, the downshift control when only a downshift request is generated is started immediately after the generation of the downshift request. In contrast, a downshift control when both a mode switch request and a downshift request are generated waits until the rotation speed of the engine has reached a combustion possible rotational speed before starting. Consequently, while the time from the generation of the request to starting of the control is relatively short in a downshift control when only a downshift request is generated, the time from the generation of the request to starting of the control becomes relatively long in a downshift control when both a mode switch request and a downshift request are generated. Here, when both a mode switch request and a downshift request are generated, the transmission speed control section makes the transmission speed at this time to be faster than when only a downshift request is generated; therefore, the time from start to completion of the downshift control can be shortened. As a result, a delay in transmission response can be prevented when a mode switch request and a downshift request have been generated.

BRIEF DESCRIPTION OF THE DRAWINGS

Referring now to the attached drawings which form a part of this original disclosure.

DETAILED DESCRIPTION OF THE EMBODIMENTS

Figure 1:
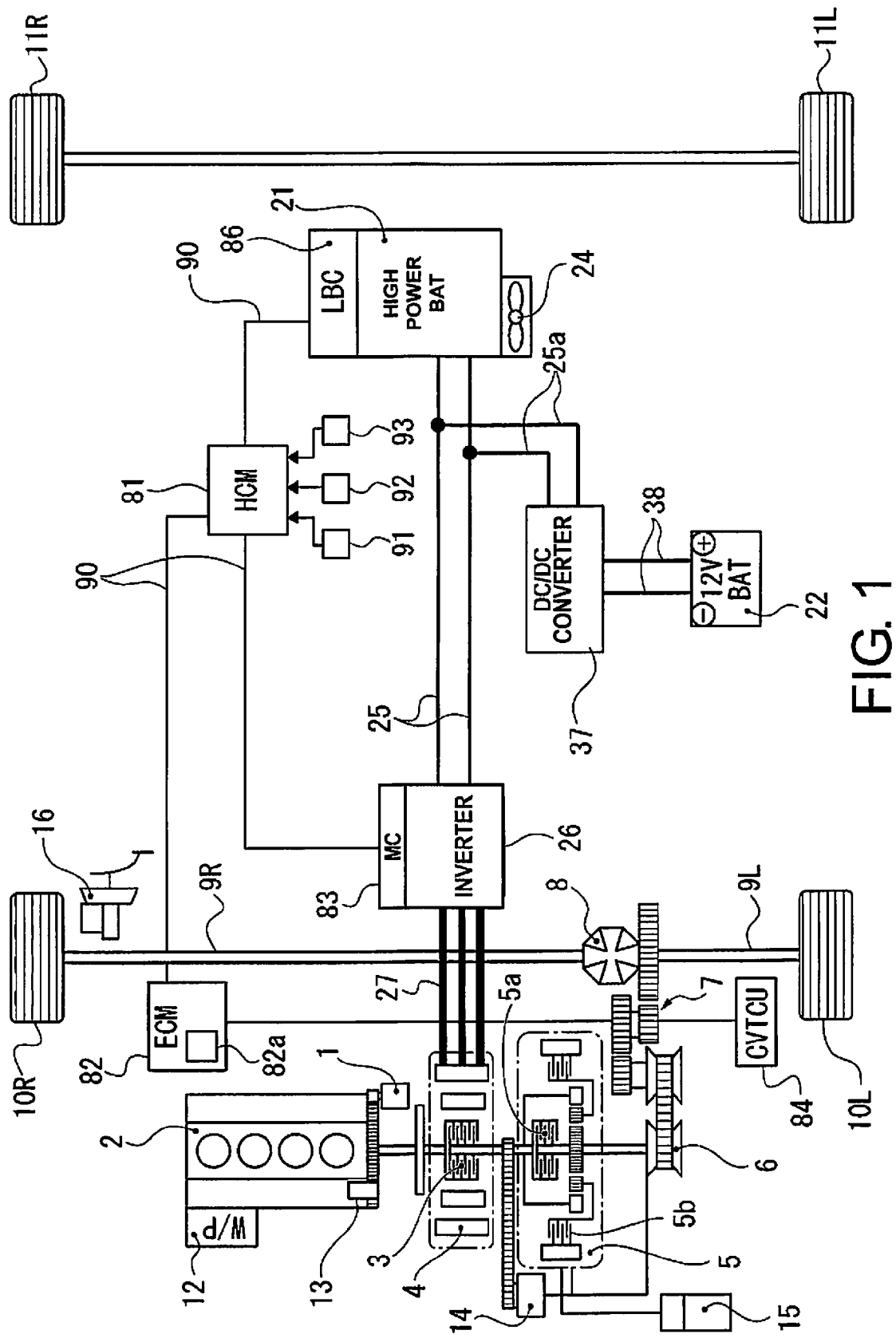
FIG. 1 is an overall system view illustrating an FF hybrid vehicle to which is applied the control device of the first embodiment.

A preferred embodiment for realizing the hybrid vehicle control device of the present invention is described below based on the first embodiment illustrated in the drawings.

First Embodiment

First, the "overall system configuration of an FF hybrid vehicle," the "detailed configuration of the mode switch/transmission cooperative control," and the "detailed configuration of the transmission speed calculation steps" will be separately described regarding the configuration of the hybrid vehicle control device of the first embodiment.

Overall System Configuration of an FF Hybrid Vehicle

FIG. 1 is an overall system view illustrating an FF hybrid vehicle to which is applied the control device of the first embodiment. The overall system configuration of an FF hybrid vehicle to which is applied the hybrid vehicle control device of the first embodiment will be described below, based on FIG. 1.

A drive system of an FF hybrid vehicle (one example of a hybrid vehicle) is provided with a starter motor 1, a transverse engine 2, a first clutch 3 (abbreviated "CL1"), a motor/generator (motor) 4, a second clutch 5 (abbreviated "CL2"), and a belt type continuously variable transmission 6 (abbreviated "CVT": automatic transmission), as illustrated in FIG. 1. An output shaft of the belt type continuously variable transmission 6 is drivingly coupled to left and right front wheels 10L, 10R, via a final reduction gear train 7, a differential gear 8, and left and right drive shafts 9L, 9R. The left and right rear wheels 11L, 11R are configured as driven wheels.

The starter motor 1 is a cranking motor having a gear that meshes with an engine starting gear provided to a crankshaft of the transverse engine 2, and which rotationally drives the crankshaft at the time of engine start.

The transverse engine 2 is an engine disposed in a front room with the crankshaft direction as the vehicle width direction, comprising an electric water pump 12, and a crankshaft rotation sensor 13 that detects a reverse rotation of the transverse engine 2.

The first clutch 3 is a hydraulically actuated normally open dry multi-plate friction clutch which is interposed between the transverse engine 2 and the motor/generator 4, in which complete engagement/slip engagement/disengagement are controlled by a first clutch hydraulic pressure.

The motor/generator 4 is a three-phase alternating current permanent magnet type synchronous motor which is coupled to the transverse engine 2 via the first clutch 3. This motor/generator 4 uses a high power battery 21 described below as the power source, and an inverter 26, which converts direct current to three-phase alternating current during powering and converts three-phase alternating current to direct current during regeneration, is connected to the stator coil via an AC harness 27.

The second clutch 5 is a hydraulically actuated normally open dry multi-plate friction clutch which is interposed between the motor/generator 4 and the left and right front wheels 10L, 10R, which are drive wheels, in which complete engagement/slip engagement/disengagement are controlled by a second clutch hydraulic pressure. The second clutch 5 of the first embodiment is configured by diverting a forward clutch 5a and a reverse brake 5b provided to a forward/reverse switching mechanism of the belt type continuously variable transmission 6 configured by a planetary gear. That is, the forward clutch 5a is used as the second clutch 5 during forward traveling, and the reverse brake 5b is used as the second clutch 5 during reverse traveling.

The belt type continuously variable transmission 6 is a transmission that achieves a stepless transmission ratio by changing the winding diameter of the belt by applying shifting hydraulic pressure to a primary oil chamber and a secondary oil chamber. This belt type continuously variable transmission 6 comprises a main oil pump 14 (mechanical drive), a sub oil pump 15 (motor drive), and an unillustrated control valve unit that produces the first and second clutch hydraulic pressure and the shifting hydraulic pressure, using the line pressure PL generated by adjusting the pump discharge pressure from the main oil pump 14 as the source pressure. The main oil pump 14 is rotationally driven by a motor shaft of the motor/generator 4 (transmission input shaft). The sub oil pump 15 is mainly used as an auxiliary pump for producing lubrication and cooling oil.

A one-motor-two-clutch drive system is configured by the first clutch 3, the motor/generator 4, and the second clutch 5, and this drive system comprises an "EV mode" and an "HEV mode" as the main traveling modes (drive modes) thereof. The "EV mode" is an electric vehicle traveling mode in which the first clutch 3 is released and the second clutch 5 is engaged, and in which the motor/generator 4 is the only drive source; traveling by this "EV mode" is referred to as "EV traveling". The "HEV" mode is a hybrid vehicle traveling mode in which the first and second clutches 3, 5 are engaged, and in which the transverse engine 2 and the motor/generator 4 are the drive sources; traveling by this "HEV mode" is referred to as "HEV traveling."

The regenerative cooperation brake unit 16 in FIG. 1 is a device that controls the total braking torque, accompanying the fact that regenerative operation is carried out in principle during brake operation. This regenerative cooperation brake unit 16 comprises a brake pedal, a negative pressure booster that uses the intake negative pressure of the transverse engine 2, and a master cylinder. Then, at the time of a brake operation, the unit carries out a cooperative control of the regeneration amount/fluid pressure amount, so that the amount obtained by subtracting the regenerative braking force from the requested braking force based on the pedal operation amount is allotted to the hydraulic braking force.

The power supply system of the FF hybrid vehicle is provided with a high power battery 21 as the motor/generator power source, and a 12V battery 22 as a 12V system load power source, as illustrated in FIG. 1.

The high power battery 21 is a secondary battery mounted as the power source of the motor/generator 4, and, for example, a lithium ion battery is used therefor, in which a cell module configured from a number of cells is set inside a battery pack case. A junction box which aggregates a relay circuit for carrying out supply/cutoff/distribution of heavy current is built in to this high power battery 21, and further attached thereto are a cooling fan unit 24 having a battery cooling function, and a lithium battery controller 86 which monitors the battery charge capacity (battery SOC) and the battery temperature.

The high power battery 21 and the motor/generator 4 are connected to the DC harness 25 and the inverter 26 via the AC harness 27. A motor controller 83 for performing powering/regeneration control is attached to the inverter 26. That is, the inverter 26 converts the direct current from the DC harness 25 to a three-phase alternating current to the AC harness 27 during powering, when the motor/generator 4 is driven by the discharge of the high power battery 21. In addition, the inverter converts the three-phase alternating current from the AC harness 27 to a direct current to the DC harness 25, during regeneration for charging the high power battery 21 with the power generation by the motor/generator 4.

The 12V battery 22 is a secondary battery mounted as a power source of a 12V system load, which is an auxiliary machine; for example, a lead battery mounted on an engine vehicle or the like is used. The high power battery 21 and the 12V battery 22 are connected via a DC branch harness 25a, a DC/DC converter 37, and a battery harness 38. The DC/DC converter 37 is for converting several hundred volts from the high power battery 21 to 12V, which is configured to manage the charging amount of the 12V battery 22 by controlling this DC/DC converter 37 with the hybrid control module 81.

The control system of an FF hybrid vehicle comprises a hybrid control module 81 (abbreviated: "HCM") as an integrated control means having a function to appropriately manage the energy consumption of the entire vehicle, as illustrated in FIG. 1. An engine control module 82 (abbreviated: "ECM"), a motor controller 83 (abbreviated: "MC"), a CVT control unit 84 (abbreviated "CVTCU"), and a lithium battery controller 86 (abbreviated: "LBC") are provided as control means that are connected to this hybrid control module 81. These control means including the hybrid control module 81 are connected so as to be capable of exchanging bidirectional information by a CAN communication line 90 (CAN is an abbreviation for "Controller Area Network").

The hybrid control module 81 carries out various controls, based on input information from each of the control means, an ignition switch 91, an accelerator position opening amount sensor (accelerator position opening amount detection means) 92, a vehicle speed sensor (vehicle speed detection means) 93, and the like. The engine control module 82 carries out fuel injection control, ignition control, fuel cut control, and the like of the transverse engine 2. The motor controller 83 carries out powering control, regenerative control, and the like of the motor/generator 4 by the inverter 26. The CVT control unit 84 carries out the engagement hydraulic pressure control of the first clutch 3, the engagement hydraulic pressure control of the second clutch 5, the shifting hydraulic pressure control of the belt type continuously variable transmission 6, and the like. The lithium battery controller 86 manages the battery SOC, the battery temperature, and the like of the high power battery 21.

Furthermore, here, a timer (stop time detection means) 82a is built into the engine control module 82, which counts the stopped time of the transverse engine 2 while the ignition switch 91 is being controlled ON.

Detailed Configuration of the Mode Switch/Transmission Cooperative Control

Figure 2:
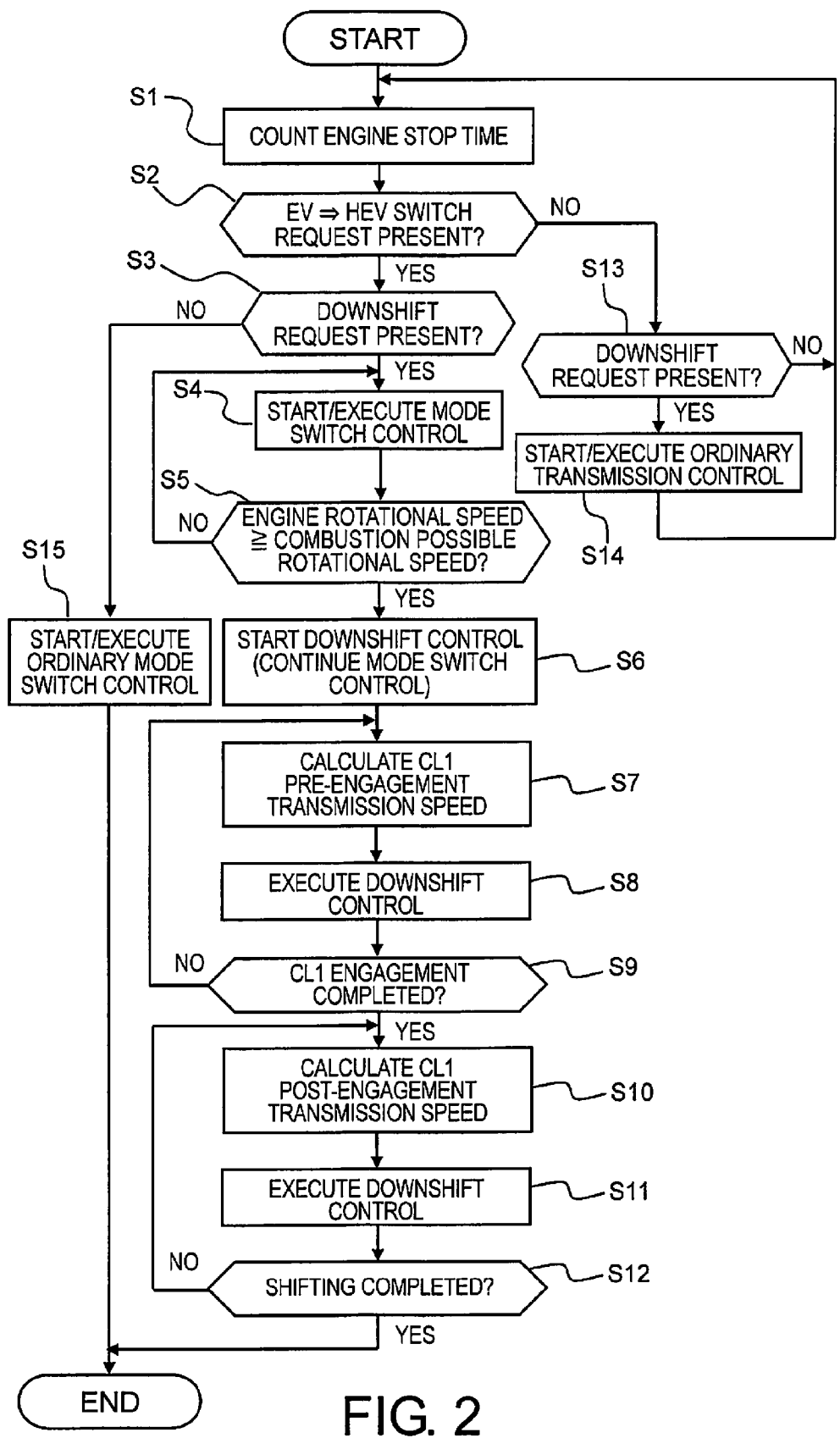
FIG. 2 is a flowchart illustrating the flow of a mode switch/transmission cooperative control steps (cooperative control means) that are executed by a hybrid control module.

FIG. 2 is a flowchart illustrating the flow of a mode switch/transmission cooperative control steps (cooperative control means) that are executed by the hybrid control module. Each step in FIG. 2 showing the detailed configuration of the mode switch/transmission cooperative control steps will be described below. The control steps are executed when the traveling mode is switched to the "EV mode."

In Step S1, the stopped time of the transverse engine 2 (hereinafter referred to as "engine stop time") is counted, and the steps proceed to Step S2. Here, the "engine stop time" is the time that the transverse engine 2 is stopped due to the traveling mode being switched to the "EV mode." This is the time that the transverse engine 2 is stopped before a mode switch control from the "EV mode" to the "HEV mode" is started. The counting of this "engine stop time" is carried out by a timer 82a provided to the engine control module 82.

In Step S2, following the counting of the engine stop time in Step S1, it is determined whether or not a mode switch request of the traveling mode in the FF hybrid vehicle from the "EV mode" to the "HEV mode" (hereinafter referred to as "EV⇒HEV switch request") has been generated. If YES (switch request present), the steps proceed to Step S3. If NO (switch request not present), the steps proceed to Step S13.

Figure 3:
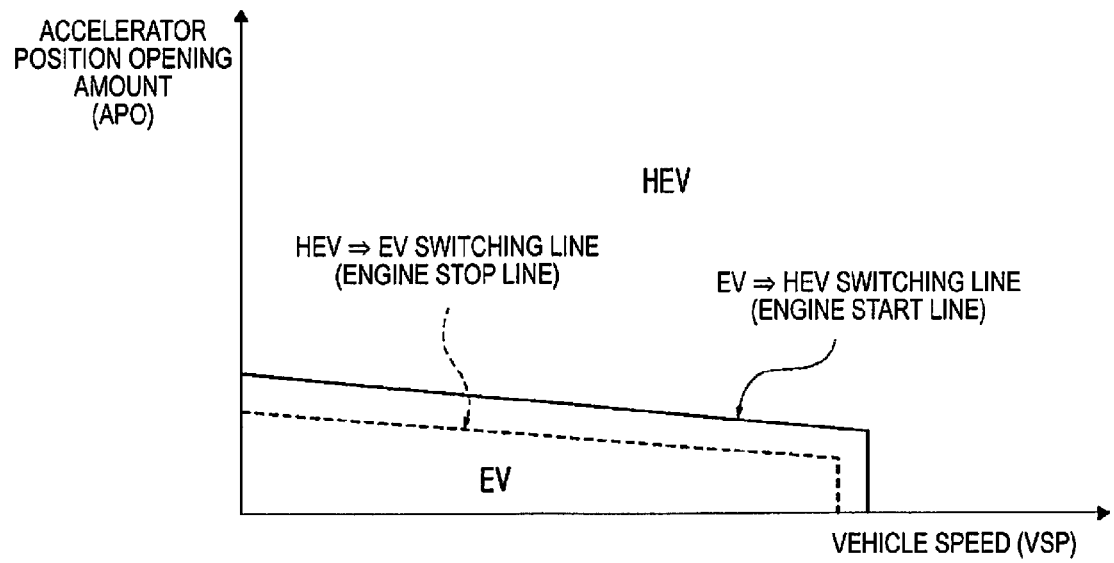
FIG. 3 is a view illustrating one example of a mode selection map.

Here, the "EV⇒HEV switch request" is outputted when the operating point (APO, VSP), which is determined by the accelerator position opening amount and the vehicle speed, moves from the "EV region" to the "HEV region" after crossing the EV⇒HEV switching line (engine start line), in the mode selection map illustrated in FIG. 3.

Figure 4:
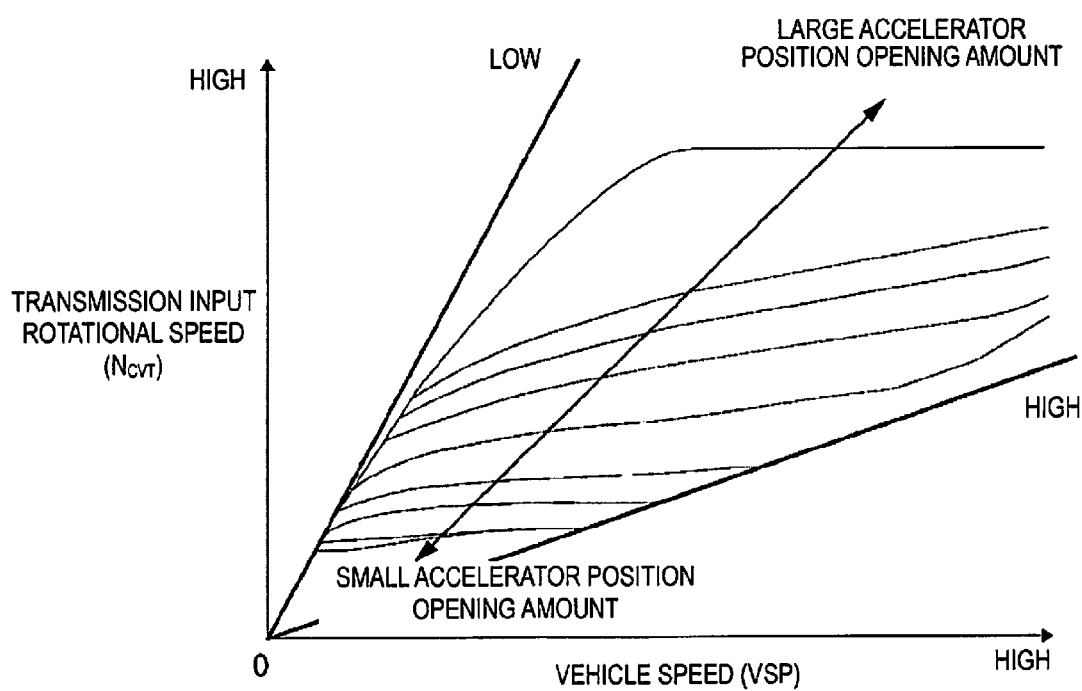
FIG. 4 is a view illustrating one example of a shifting diagram of a belt type continuously variable transmission.

In Step S3, following the determination that an "EV⇒HEV switch request" is present in Step S2, it is determined whether or not a downshift request of the belt type continuously variable transmission 6 has been outputted. If YES (downshift request present), the steps proceed to Step S4. If NO (downshift request not present), the steps proceed to Step S15. Here, the "downshift request" is outputted when the operating point ($N_{CVT}$, VSP), which is determined by the transmission input rotational speed and the vehicle speed, moves from the current position toward the lowest transmission line, in the shifting diagram illustrated in FIG. 4.

In Step S4, following the determination that a downshift request is present in Step S3, an EV⇒HEV switch request and a downshift request of the belt type continuously variable transmission 6 are considered to have been generated simultaneously; a mode switch control is immediately started/executed, and the steps proceed to Step S5. Here, a "mode switch control" is starting the transverse engine 2 while engaging the first clutch 3, and transitioning the drive mode from the "EV mode" to the "HEV mode." This "mode switch control" comprises an engine start step that engages the first clutch 3, raises the engine rotation speed by rotating the crankshaft of the transverse engine 2 with the motor/generator 4, and carries out fuel injection and ignition after the engine rotation speed has reached a combustion possible rotational speed, and a first clutch engagement step that engages the first clutch 3 and transmits the driving force of the transverse engine 2 to the left and right front wheels 10L, 10R, which are driving wheels. This engine start steps and first clutch engagement steps are executed in parallel. The engine start steps may be executed using the starter motor 1 as well.

In Step S5, following the start/execution of the mode switch control in Step S4, it is determined whether or not the rotation speed of the transverse engine 2 has reached a combustion possible rotational speed. If YES (engine rotation speed≥combustion possible rotational speed), the steps proceed to Step S6. If NO (engine rotation speed≤combustion possible rotational speed), the steps return to Step S4. Here, a "combustion possible rotational speed" is a rotation speed with which the transverse engine 2 becomes capable of autonomous rotation, and a rotation speed with which engine rotation can be maintained by fuel injection and ignition.

In Step S6, following the determination that engine rotation speed≥combustion possible rotational speed in Step S5, a downshift control in the belt type continuously variable transmission 6 is started, and the steps proceed to Step S7. At this time, the mode switch control is continued to be executed. Here, a "downshift control" is a control in which the transmission ratio in the belt type continuously variable transmission 6 is changed to the low side. This "downshift control" comprises a hydraulic pressure control step for changing the winding diameter of the belt by applying shifting hydraulic pressure to a primary oil chamber and a secondary oil chamber of the belt type continuously variable transmission 6, and a motor rotation speed control step for raising the rotation speed of the motor/generator 4, which is the transmission input rotational speed. The hydraulic pressure control steps and motor rotation speed control steps are executed in parallel.

In Step S7, following the start of the downshift control in Step S6, a CL1 pre-engagement transmission speed is calculated, and the steps proceed to Step S8. Here, the "CL1 pre-engagement transmission speed" is the transmission speed during a downshift control that is executed before the first clutch 3 is completely engaged. The calculation of this transmission speed will be described below.

In Step S8, following the calculation of the CL1 pre-engagement transmission speed in Step S7, a downshift control is executed at the CL1 pre-engagement transmission speed calculated in Step S7, and the steps proceed to Step S9.

In Step S9, following the execution of the downshift control in Step S8, it is determined whether or not the engagement of the first clutch 3 has been completed, that is, whether or not the first clutch 3 is fully engaged. If YES (CL1 engaged), the steps proceed to Step S10. If NO (CL1 non-engaged), the steps return to Step S7. Here, the complete engagement of the first clutch 3 is determined when the rotation speed of the transverse engine 2 and the rotation speed of the motor 4 match.

In Step S10, following the determination that CL1 is engaged in Step S9, a CL1 post-engagement transmission speed is calculated, and the steps proceed to Step S11. Here, the "CL1 post-engagement transmission speed" is the transmission speed during a downshift control that is executed after the first clutch 3 is completely engaged.

In Step S11, following the calculation of the CL1 post-engagement transmission speed in Step S10, a downshift control is executed at the CL1 post-engagement transmission speed calculated in Step S10, and the steps proceed to Step S12.

In Step S12, following the execution of the downshift control in Step S11, it is determined whether or not the downshift control has been completed. If YES (shifting completed), the steps proceed to END. If NO (shifting not completed), the steps return to Step S10.

In Step S13, following the determination that an "EV ⇒ HEV switch request" is not present in Step S2, it is determined whether or not a downshift request of the belt type continuously variable transmission 6 has been outputted. If YES (downshift request present), the steps proceed to Step S14. If NO (downshift request not present), the steps return to Step S1, concluding that there is no control that requires execution.

In Step S14, following the determination that a downshift request is present in Step S13, an ordinary transmission control is started/executed, and the steps return to Step S1. Here, an "ordinary transmission control" is immediately carrying out a downshift control at an ordinary transmission speed which is set in advance when a downshift request is outputted.

In Step S15, following the determination that a downshift request is not present in Step S3, an ordinary mode switch control is started/executed, and the steps proceed to END. Here, an "ordinary mode switch control" is immediately carrying out a mode switch control when a mode switch request is outputted.

Detailed Configuration of the Transmission Speed Calculation Steps

Figure 5:
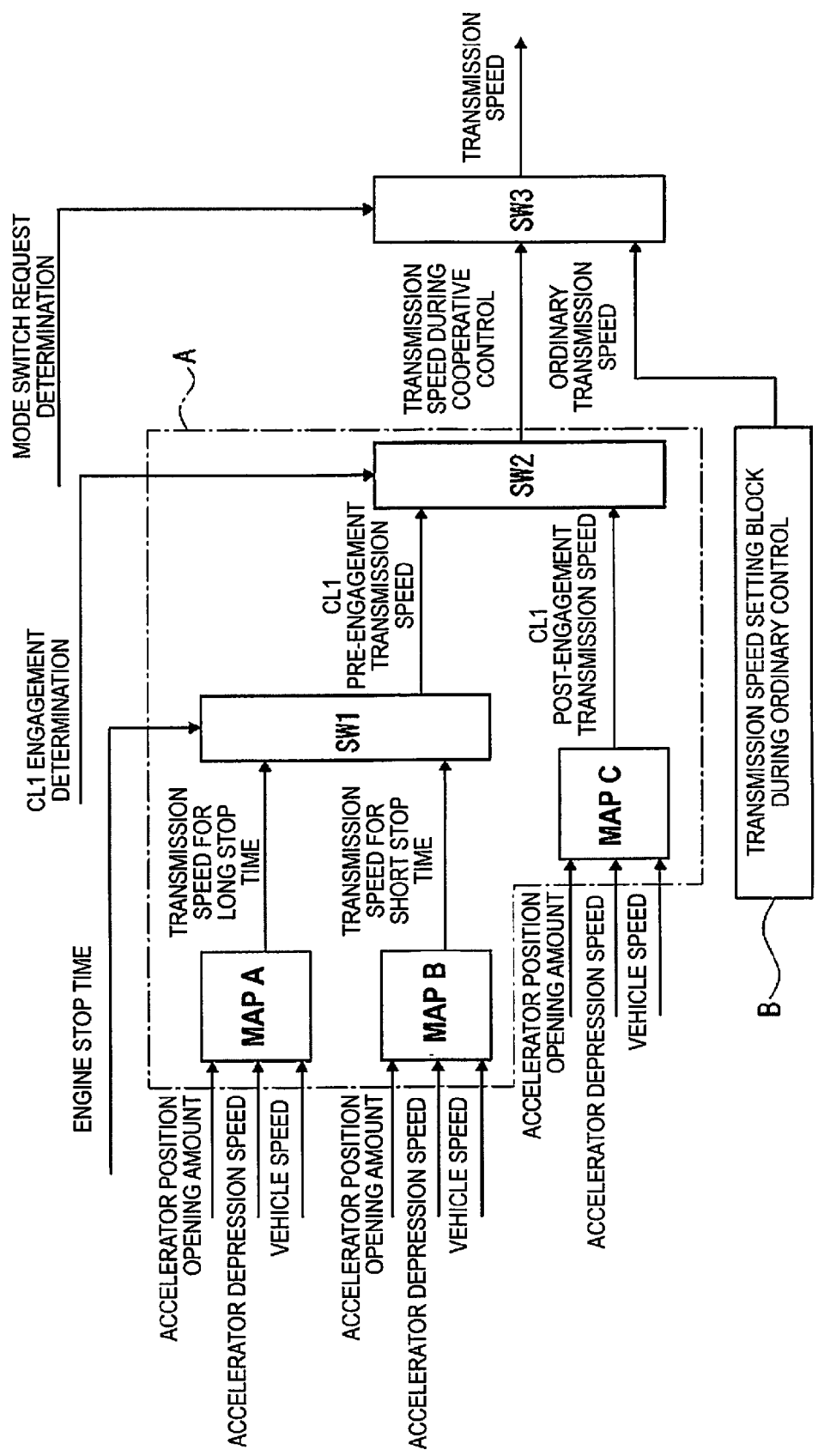
FIG. 5 is a block view illustrating a transmission speed calculation steps that are executed by the hybrid control module of the first embodiment.

FIG. 5 is a block view illustrating the transmission speed calculation steps that are executed by the hybrid control module of the first embodiment. The detailed configuration of the transmission speed calculation steps of the first embodiment will be described below, based on FIG. 5.

The transmission speed during the downshift control in the first embodiment is set by the transmission speed calculation steps illustrated in FIG. 5. That is, this transmission speed calculation steps comprise a transmission speed calculation block during cooperative control A, a transmission speed setting block during ordinary control B, and a third switch SW3.

The transmission speed calculation block during cooperative control A calculates the transmission speed that is applied when a mode switch request and a downshift request are generated (hereinafter referred to as "transmission speed during cooperative control"). This transmission speed calculation block during cooperative control A comprises a map A/map B/map C which are set in advance, a first switch SW1 and a second switch SW2.

The map A, map B, and map C are all transmission speed setting maps which uniquely set the transmission speed, on the basis of the accelerator position opening amount detected by the accelerator position opening amount sensor 92, the accelerator depression speed at this time, and the vehicle speed detected by the vehicle speed sensor 93. The accelerator position opening amount and the accelerator depression speed are parameters that indicate the required driving force of the driver.

The map A sets a transmission speed that is applied before the first clutch 3 is completely engaged, and when the engine stop time which is counted by the timer 82a is longer than a predetermined time. The transmission speed setting conditions in this map A are as listed below.

(1) When the accelerator position opening amount is at a medium opening amount or more.
Set to a value faster than the ordinary transmission speed.
Set to a faster value as the accelerator position opening amount and the accelerator depression speed are increased, that is, as the required driving force of the driver is increased.
Set to a slower value as the vehicle speed is increased.
Set an upper limit value so as not to delay the engagement of the first clutch 3.

(2) When the accelerator position opening amount is a low opening amount and the depression speed is low.
Set to a value slower than the ordinary transmission speed.

Here, the "predetermined time" which is the reference for determining that the "engine stop time is long" is a time with which it is possible to secure an engine suction pressure that can obtain an engine torque that allows a quick engine rotation rise at the time of engine start. When the engine stop time is short, the air inside the transverse engine 2 is expanded due to heating, the engine intake pressure becomes low, and an engine torque cannot be outputted. As a result, the engine rotation rise is slowed, the engagement of the first clutch 3 takes time, and the mode switch time becomes long. That is, in this map A, the time with which it can be determined that the engine rotation rise will not be slowed due to not being able to obtain the engine intake pressure, and the transmission speed that is to be applied when the transverse engine 2 is stopped are set.

In addition, "accelerator position opening amount is at a medium opening amount" is an accelerator depression state of a level at which it can be determined that a required driving force of the driver is clearly being generated. Additionally, "accelerator position opening amount is at a low opening amount" is an accelerator depression state of a level at which it can be determined that a required driving force of the driver is hardly generated, or is not generated at all. Furthermore, "depression speed is low" is an accelerator depression speed of a level at which it can be determined that a required driving force of the driver is hardly generated, or is not generated at all.

Furthermore, an "upper limit value so as not to delay the engagement of the first clutch 3" is a value for preventing the engagement of the first clutch 3 being delayed due to the increase rate of the engine rotation speed not being able to catch up, if the increase rate of the motor rotation speed is made too fast, when increasing the motor rotation speed in order to increase the transmission input rotational speed accompanying a downshift control. That is, by suppressing the transmission speed, an excessively fast increase in the motor rotation speed can be suppressed, and the engine rotation speed and the motor rotation speed can be matched at an appropriate timing.

The map B sets a transmission speed that is applied before the first clutch 3 is completely engaged, and when the engine stop time which is counted by the timer 82a is equal to or less than a predetermined time. The transmission speed setting conditions in this map B are as listed below.

(1) When the accelerator position opening amount is at a medium opening amount or more.

Set to a value faster than the ordinary transmission speed, but a value that is slower than the setting value in map A.

Set to a faster value as the accelerator position opening amount and the accelerator depression speed are increased, that is, as the required driving force of the driver is increased.

Set to a slower value as the vehicle speed is increased.

Set an upper limit value so as not to delay the engagement of the first clutch 3.

(2) When the accelerator position opening amount is a low opening amount and the depression speed is low.

Set to a value slower than the ordinary transmission speed, and a value that is slower than in map A.

The map C sets a transmission speed that is applied after the first clutch 3 is completely engaged. The transmission speed setting conditions in this map C are as listed below.

(1) When the accelerator position opening amount is at a medium opening amount or more.

Set to a value faster than the ordinary transmission speed.

Set to a faster value as the accelerator position opening amount and the accelerator depression speed are increased, that is, as the required driving force of the driver is increased.

Set to a slower value as the vehicle speed is increased.

An upper limit value is not set, since the first clutch 3 is engaged.

(2) When the accelerator position opening amount is a low opening amount and the depression speed is low.

Set to a value slower than the ordinary transmission speed.

The first switch SW1 and the second switch SW2 are both selection operators for selecting the transmission speed that meets a predetermined condition from a plurality of inputted transmission speeds.

The first switch SW1 selects one transmission speed from a "transmission speed when stopped time is long" that is applied when the engine stop time set based on map A is long, and a "transmission speed when stopped time is short" that is applied when the engine stop time set based on map B is short, based on the actual engine stop time that is counted by the timer 82a, and sets a "CL1 pre-engagement transmission speed" that is applied before the first clutch 3 is completely engaged.

Specifically, if the actual engine stop time is longer than a predetermined time, the "transmission speed when stopped time is long" is selected as the CL1 pre-engagement transmission speed. Additionally, if the actual engine stop time is shorter than a predetermined time, the "transmission speed when stopped time is short" is selected as the CL1 pre-engagement transmission speed.

The second switch SW2 selects one transmission speed from a "CL1 pre-engagement transmission speed" that is selected and set by the first switch SW1, and a "CL1 post-engagement transmission speed" that is set on the basis of map C, based on the results of the engagement determination of the first clutch 3, and sets a "transmission speed during cooperative control" that is applied when a mode switch request and a downshift request are generated.

Specifically, if the CL1 engagement determination is YES (first clutch 3 is in a completely engaged state), the "CL1 post-engagement transmission speed" is selected as the transmission speed during cooperative control. In addition, if the CL1 engagement determination is NO (first clutch 3 is in a state of not being completely engaged), the "CL1 pre-engagement transmission speed" is selected as the transmission speed during cooperative control.

An ordinary transmission speed that is set in advance is stored in the transmission speed setting block during ordinary control B.

The third switch SW3 is a selection operator for selecting the transmission speed that meets a predetermined condition from a plurality of inputted transmission speeds. That is, in this third switch SW3, one transmission speed is selected from a transmission speed during cooperative control that is set in the transmission speed calculation block during cooperative control A, and an ordinary transmission speed that is stored in the transmission speed setting block during ordinary control B, based on the results of the mode switch request determination, to set the "transmission speed" at the time of downshift control.

Specifically, if the mode switch request determination is YES (state in which "EV⇒HEV switch request" has been outputted), the "transmission speed during cooperative control" is selected as the transmission speed. In addition, if the mode switch request determination is NO (state in which "EV⇒HEV switch request" has not been outputted), the "ordinary transmission speed" is selected as the transmission speed.

Next, the "transmission speed changing action," the "first clutch engagement action," and the "torque fluctuation suppression action" will be separately described regarding the actions of the FF hybrid vehicle control device of the first embodiment.

Transmission Speed Changing Action

Figure 6:
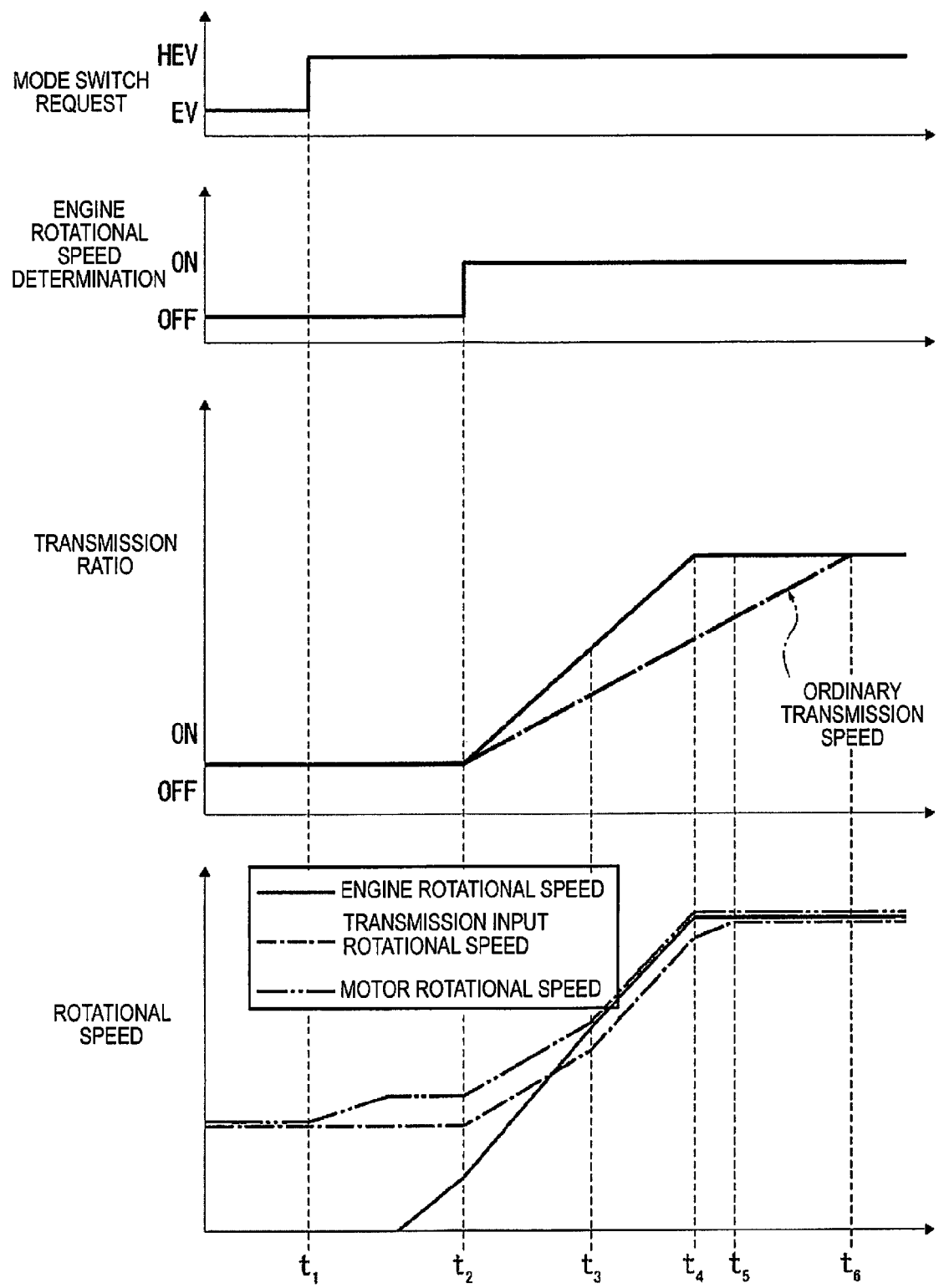
FIG. 6 is a time chart illustrating each characteristic of a mode switch request, engine rotation speed determination, transmission ratio, engine rotation speed, transmission input rotational speed, and motor rotation speed, when a mode switch request and a downshift request are present, in the control device of the first embodiment.

FIG. 6 is a time chart illustrating each characteristic of a mode switch request, engine rotation speed determination, transmission ratio, engine rotation speed, transmission input rotational speed, and motor rotation speed, when a mode switch request and a downshift request are present, in the control device of the first embodiment. The transmission speed changing action of the first embodiment will be described below, based on FIG. 6.

When the FF hybrid vehicle of the first embodiment is traveling in the "EV mode," the flowchart illustrated in FIG. 2 (mode switch/transmission cooperative control steps) are executed, the steps proceed from Step S1 to Step S2, and the stopped time of the transverse engine 2 is counted while it is determined whether or not an "EV⇒HEV switch request" has been outputted.

Here, if an "EV⇒HEV switch request" is not being outputted, the steps proceed to Step S13, and it is determined whether or not a downshift request has been outputted. If a downshift request is outputted, the steps proceed to Step S14. At this time, since only a downshift request is being outputted, a downshift control is immediately started/executed. Regarding the transmission speed at this time, an "EV⇒HEV switch request" has not been outputted, and the mode switch request determination is NO. Accordingly, the "ordinary transmission speed" is selected as the transmission speed by the third switch SW3 in the calculation steps illustrated in FIG. 5. As a result, the transmission speed will be the ordinary transmission speed which is set in advance. Then, the steps proceed to Step S1 to continue the counting of the engine stop time. In addition, if a downshift request has not been outputted following the "EV⇒HEV switch request," the steps return to Step S1 since there is no control to execute, and the counting of the engine stop time is continued.

On the other hand, when an "EV⇒HEV switch request" is outputted, the steps proceed to Step S3, and it is determined whether or not a downshift request has been outputted. If a downshift request has not been outputted, the steps proceed to Step S15. At this time, since only an "EV⇒HEV switch request" is being outputted, a mode switch control is immediately started/executed. The traveling mode is thereby switched from the "EV mode" to the "HEV mode," and the mode switch/transmission cooperative control steps illustrated in FIG. 2 are ended.

In addition, if it is determined that an output of a downshift request is present following the output of the "EV⇒HEV switch request," the steps proceed to Step S4 in the flowchart of FIG. 2, and the mode switch control is immediately started/executed. Accordingly, the rotation speed of the motor/generator 4 is controlled while the engagement control of the first clutch 3 is started, and the rotation speed of the transverse engine 2 starts to increase due to the motor rotation speed being transmitted to the transverse engine 2 via the first clutch 3. That is, in the time chart illustrated in FIG. 6, when an "EV⇒HEV switch request" and a downshift request are outputted at time $t_1$, the motor rotation speed is first increased to a rotation speed that is required for engine cranking by starting/executing a mode switch control. Additionally, the engagement control of the first clutch 3 is started. At this time, the second clutch 5 is slip engaged while securing the transmission of the required driving force of the driver. Accordingly, the transmission input rotational speed will not fluctuate.

Then, the steps proceed to Step S5, and it is determined whether or not the engine rotation speed has reached the combustion possible rotational speed and is capable of autonomous rotation. That is, when the engine rotation speed reaches the combustion possible rotational speed at time $t_2$, the engine rotation speed determination is switched to ON. Accordingly, the steps proceed to Step S5→Step S6→Step S7→Step S8, a downshift control of the belt type continuously variable transmission 6 is started, the CL1 pre-engagement transmission speed is first calculated, and the downshift control is executed according to this CL1 pre-engagement transmission speed.

Here, the CL1 pre-engagement transmission speed is calculated based on the accelerator position opening amount/accelerator depression speed/vehicle speed and on the map A or map B in the calculation steps illustrated in FIG. 5. At this time, if the engine stop time before time $t_1$ is longer than a predetermined value and the accelerator position opening amount is a medium opening amount or more, the CL1 pre-engagement transmission speed is set to a value that is faster than the ordinary transmission speed, based on map A. That is, the transmission ratio starts to increase from time $t_2$ with the execution of the downshift control, and the slope of the change of the transmission ratio at this time becomes greater than the slope during a downshift control at the ordinary transmission speed indicated by the dashed line, as illustrated in FIG. 6. This CL1 pre-engagement transmission speed is set to a faster value as the accelerator position opening amount and the accelerator depression speed are increased, that is, as the required driving force of the driver is increased.

Then, at time $t_3$, when the engine rotation speed and the motor rotation speed match and the first clutch 3 is engaged, the steps proceed to Step S9→Step S10→Step S11, the CL1 post-engagement transmission speed is calculated, and the downshift control is executed according to this CL1 post-engagement transmission speed.

Here, the CL1 post-engagement transmission speed is calculated based on the accelerator position opening amount/accelerator depression speed/vehicle speed and on the map C in the calculation steps illustrated in FIG. 5, and is set to a value that is faster than the ordinary transmission speed. That is, the slope of the change of the transmission ratio after time $t_3$ becomes greater than the slope during a downshift control at the ordinary transmission speed indicated by the dashed line, as illustrated in FIG. 6. In addition, this CL1 post-engagement transmission speed is set to a faster value as the accelerator position opening amount and the accelerator depression speed are increased, that is, as the required driving force of the driver is increased. Furthermore, in this CL1 post-engagement transmission speed, an upper limit value so as not to delay the engagement of the first clutch 3 is not set.

Then, the transmission ratio reaches the target transmission ratio while the engine rotation speed and the motor rotation speed become stable at time $t_4$, and the transmission input rotational speed, the engine rotation speed, and the motor rotation speed are matched by the second clutch 5 being completely engaged at time $t_5$, at which point the downshift control is completed. Accordingly, YES is determined in Step S12, and the mode switch/transmission cooperative control is ended.

In contrast, as illustrated by the dashed line in FIG. 6, if a downshift control is carried out at the ordinary transmission speed from time $t_2$ at which the engine rotation speed reaches the combustion possible rotational speed, the transmission speed is slower than the first embodiment; therefore, the transmission ratio reaches the target transmission ratio at the timing of time $t_6$, which is later than time $t_5$.

In this manner, in the hybrid vehicle control device of the first embodiment, if a mode switch request and a downshift request are generated, mode switch control is started first. Then, downshift control is started once the rotational speed of the transverse engine 2 has reached a combustion possible rotational speed. Additionally, the transmission speed during cooperative control which is the transmission speed during the downshift control at this time is set to a value that is faster than the ordinary transmission speed (transmission speed when only the downshift request is generated). Accordingly, the downshift control progresses more quickly than during an ordinary transmission. As a result, the timing at which the downshift control is completed can be expedited compared to when carrying out a downshift control at the ordinary transmission speed, and a delay in transmission response can be prevented.

In addition, this transmission speed during cooperative control is set to a faster value as the accelerator position opening amount and the accelerator depression speed are increased, that is, as the required driving force of the driver is increased. Accordingly, the transmission speed is increased as the required driving force of the driver is increased, and an improvement in the transmission response can be achieved. The necessary driving force can thereby be quickly obtained.

Then, in the hybrid vehicle control device of the first embodiment, the transmission speed during cooperative control is divided into the CL1 pre-engagement transmission speed that is applied before the first clutch 3 is completely engaged, and the CL1 post-engagement transmission speed that is applied after the first fluid 3 is engaged. Here, in the CL1 post-engagement transmission speed, an upper limit value so as not to delay the engagement of the first clutch 3 is not set. Accordingly, the transmission speed after the first clutch 3 is engaged can be made faster than the transmission speed before the first clutch 3 is engaged. Accordingly, in a situation in which it is not necessary to consider a delay in the engagement of the first clutch 3, the transmission speed during a downshift control can be made even faster, and a further improvement in the transmission response can be achieved.

First Clutch Engagement Action

In the hybrid vehicle control device of the first embodiment, the transmission speed during cooperative control is calculated based on one of the accelerator position opening amount/accelerator depression speed/vehicle speed, and the map A, map B, map C in the calculation steps illustrated in FIG. 5

At this time, the CL1 pre-engagement transmission speed, which is applied before the first clutch 3 is engaged, is set to a slower value when the stopped time of the transverse engine 2 is short, compared to when the engine stop time is long. That is, the CL1 pre-engagement transmission speed is calculated based on map A or map B but the transmission speed that is applied when the engine stop time is equal to or less than a predetermined time is set based on map B. In this map B, the transmission speed is set to a value faster than the ordinary transmission speed, but a value that is slower than the setting value in map A, when the accelerator position opening amount is at a medium opening amount or more.

Accordingly, when the engine stop time is short, the engine intake pressure is low, and the rotation rise of the transverse engine 2 becomes slow due to lack of engine torque, the transmission speed during cooperative control becomes relatively slow. Accordingly, when the engagement of the first clutch 3 takes time due to the rotation rise of the engine rotation being slow, an increase in the motor rotation speed accompanying a downshift control can be suppressed by suppressing an increase in the transmission speed, and it is possible to prevent the engagement of the first clutch 3 taking time, and the engine start taking more time than necessary.

Additionally, in this CL1 pre-engagement transmission speed, an upper limit value is set so as not to delay the engagement of the first clutch 3. Accordingly, while the motor rotation speed is increased in order to increase the transmission input rotational speed accompanying a downshift control, it is possible to prevent a delay in the engagement of the first clutch 3, by the increase rate of this motor rotation speed being limited, and the engine rotation speed and the motor rotation speed being matched at an appropriate timing.

Furthermore, in any of the map A, map B, and map C, the transmission speed during cooperative control is set to a slower value as the vehicle speed is increased. Here, the motor rotation speed when executing a mode switch control or a downshift control is higher when the vehicle speed is fast, compared to when the vehicle speed is slow. At this time, it is possible to suppress the increase rate of the motor rotation in relation to the increase rate of the engine rotation speed by slowing the transmission speed during cooperative control, and it is possible to prevent the engagement of the first clutch 3 taking time, and the engine start taking more time than necessary.

Torque Fluctuation Suppression Action

In the hybrid vehicle control device of the first embodiment, when the transmission speed during cooperative control is calculated based on one of the accelerator position opening amount/accelerator depression speed/vehicle speed, and the map A, map B, and map C in the calculation steps illustrated in FIG. 5, the transmission speed during cooperative control is set to a value that is slower than the ordinary transmission control, if the accelerator position opening amount is a low opening amount and the depression speed is small.

Here, "if the accelerator position opening amount is a low opening amount and the depression speed is small" is a state in which it can be determined that a required driving force of the driver is hardly generated, or is not generated at all, such as a state in which the foot is away from the accelerator. At this time, it can be thought that the driver does not want a variation in the driving force; therefore, there is the risk that discomfort is imparted if the driving force is changed.

In contrast, if the accelerator position opening amount is at a low opening amount and the depression speed is low, the downshift control will progress more slowly than during ordinary transmission, by setting the transmission speed during cooperative control to a value that is slower than the ordinary transmission speed. As a result, an abrupt variation in the driving force is suppressed, and imparting discomfort to the driver can be prevented.

Next, the effects are described. The effects listed below can be obtained with the FF hybrid vehicle control device according to the first embodiment.

(1) A hybrid vehicle control device in which an engine (transverse engine) 2, a motor (motor/generator) 4, and an automatic transmission (belt type continuously variable transmission) 6 are provided to a drive system, and in which when there is a mode switch request during an electric vehicle traveling mode (EV mode) where only the motor 4 is a drive source, a shift is made to a hybrid vehicle traveling mode (HEV mode) where the engine 2 and the motor 4 are drive sources, comprising a cooperative control means (FIG. 2) which, if the mode switch request and a downshift request of the automatic transmission 6 are generated, immediately starts a mode switch control, and starts a downshift control once the rotational speed of the engine 2 has reached a combustion possible rotational speed, wherein the cooperative control means (FIG. 2) is configured to comprise a transmission speed control section (step S7-step S11) which sets the transmission speed during the downshift control to be faster than the transmission speed during a downshift control when only the downshift request of the automatic transmission is generated. Accordingly, a delay in transmission response can be prevented when a mode switch request and a downshift request have been generated.

(2) The transmission speed control section (Step S7-Step S11) is configured to make the transmission speed during the downshift control to be faster as the required driving force of the driver is increased. Accordingly, in addition to the effect of (1), it is possible to achieve an improvement the transmission response as the required driving force of the driver is increased, and the necessary driving force can be quickly obtained.

(3) Provided with a stop time detection means (timer) 82a that detects a stopped time of the engine (transverse engine) 2 before the mode switch control is started, wherein the transmission speed control section (Step S7-Step S11) is configured to make the transmission speed during the downshift control when the stopped time of the engine 2 is short to be slower than the transmission speed during the downshift control when the stopped time of the engine 2 is long. Accordingly, in addition to the effects of (1) or (2), when the engine stop time is short, the engine intake pressure is low, and the rotation rise of the transverse engine 2 becomes slow due to lack of engine torque, an increase in the motor rotation speed accompanying a downshift control can be suppressed, and it is possible to prevent the engine start taking more time than necessary.

(4) Provided with a vehicle speed detection means (vehicle speed sensor) 93 that detects the vehicle speed, wherein the transmission speed control section (Step S7-Step S11) is configured to make the transmission speed during the downshift control when the vehicle speed is fast to be slower than the transmission speed during the downshift control when the vehicle speed is slow. Accordingly, in addition to the effects of any one of (1) to (3), when the vehicle speed is fast and the motor rotation speed is high, it is possible to suppress the increase rate of the motor rotation in relation to the increase rate of the engine rotation speed, and to prevent the engine start taking more time than necessary.

(5) The drive system is provided with a first clutch 3 interposed between the engine 2 and the motor 4, wherein the transmission speed control section (Step S7-Step S11) is configured to make the transmission speed during the downshift control after the first clutch 3 is engaged (CL1 post-engagement transmission speed) to be faster than the transmission speed during the downshift control before the first clutch 3 is completely engaged (CL1 pre-engagement transmission speed). Accordingly, in addition to the effect of any one of (1) to (4), in a situation in which it is not necessary to consider a delay in the engagement of the first clutch 3, the transmission speed during a downshift control can be made even faster, and a further improvement in the transmission response can be achieved.

(6) Provided with an accelerator position opening amount detection means (accelerator position opening amount sensor) 92 that detects the accelerator position opening amount, wherein the transmission speed control section (Step S7-Step S11) is configured to make the transmission speed during the downshift control when it is determined that the accelerator position opening amount is at a low opening amount and the an accelerator depression speed is low to be slower than the transmission speed during a downshift control when only a downshift request of the automatic transmission (belt type continuously variable transmission) 6 has been generated. Accordingly, in addition to the effect of any one of (1) to (5), when it can be thought that the driver does not want a variation in the driving force, it is possible to suppress an abrupt variation in the driving force, and to prevent imparting discomfort to the driver.

The hybrid vehicle control device of the present invention was described above based on the first embodiment, but specific configurations thereof are not limited to this embodiment, and various modifications and additions to the design can be made without departing from the scope of the invention according to each claim in the Claims.

In the first embodiment, an example was shown in which, in the transmission speed calculation steps illustrated in FIG. 5, the transmission speed is calculated based on the accelerator position opening amount/accelerator depression speed/vehicle speed and on the map A or map B, and the final CL1 pre-engagement transmission speed is set in accordance with the engine stop time. However, the calculation steps of the CL1 pre-engagement transmission speed are not limited thereto; for example, the steps may be a transmission speed calculation block during cooperative control A1 illustrated in FIG. 7.

Figure 7:
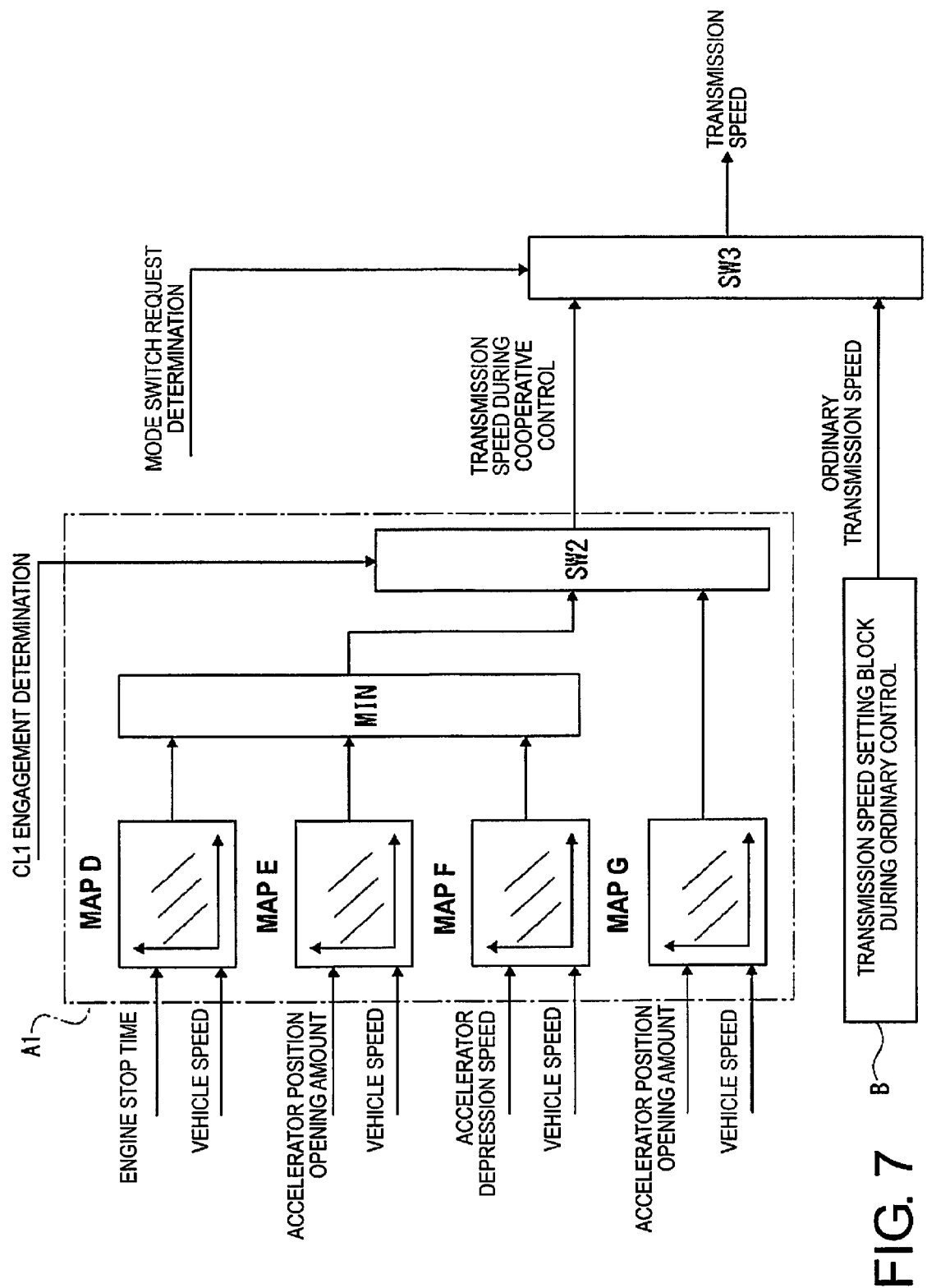
FIG. 7 is a block view illustrating another example of the transmission speed calculation steps that are executed by the hybrid control module.

This transmission speed calculation block during cooperative control A1 illustrated in FIG. 7 comprises a map D/map E/map F/map G which are set in advance, a minimum selection operator MIN, and a second switch SW2.

The map D is a transmission speed setting map that uniquely sets the transmission speed, on the basis of the engine stop time and the vehicle speed.

The transmission speed setting conditions in this map D are as listed below.
  Set to a value faster than the ordinary transmission speed.
  Set to a slower value as the engine stop time is increased.
  Set to a slower value as the vehicle speed is increased.
  Set an upper limit value so as not to delay the engagement of the first clutch 3.

The map E is a transmission speed setting map that uniquely sets the transmission speed, on the basis of the accelerator position opening amount and the vehicle speed.

The transmission speed setting conditions in this map E are as listed below.
  (1) When the accelerator position opening amount is at a medium opening amount or more.
    Set to a value faster than the ordinary transmission speed.
    Set to a faster value as the accelerator position opening amount is increased, that is, as the required driving force of the driver is increased.
    Set to a slower value as the vehicle speed is increased.
    Set an upper limit value so as not to delay the engagement of the first clutch 3.
  (2) When the accelerator position opening amount is a low opening amount
    Set to a value slower than the ordinary transmission speed.

The map F is a transmission speed setting map that uniquely sets the transmission speed, on the basis of the accelerator depression speed and the vehicle speed.

The transmission speed setting conditions in this map F are as listed below.
  (1) When the accelerator depression speed is not low
    Set to a value faster than the ordinary transmission speed.
    Set to a faster value as the accelerator depression speed is increased, that is, as the required driving force of the driver is increased.
    Set to a slower value as the vehicle speed is increased.
    Set an upper limit value so as not to delay the engagement of the first clutch 3.
  (2) When the accelerator depression speed is low
    Set to a value slower than the ordinary transmission speed.

The minimum selection operator MIN is a selection operator that selects the transmission speed that is set to the smallest value from the plurality of inputted transmission speeds and sets the same as the CL1 pre-engagement transmission speed.

Furthermore, the map G is a transmission speed setting map that uniquely sets the CL1 post-engagement transmission speed that is applied after the first clutch 3 is completely engaged, on the basis of the accelerator position opening amount and the vehicle speed.

The transmission speed setting conditions in this map G are as listed below.

(1) When the accelerator position opening amount is at a medium opening amount or more.
  Set to a value faster than the ordinary transmission speed.
  Set to a faster value as the accelerator position opening amount is increased, that is, as the required driving force of the driver is increased.
  Set to a slower value as the vehicle speed is increased.
  An upper limit value is not set, since the first clutch 3 is engaged.
(2) When the accelerator position opening amount is a low opening amount
  Set to a value slower than the ordinary transmission speed.

Even in the transmission speed calculation steps illustrated in FIG. 7, unless the accelerator position opening amount is at a low opening amount or the depression speed is small, the transmission speed during cooperative control is set to a value that is faster than the ordinary transmission speed, and it is possible to prevent a delay in the transmission response. In addition, it is possible to prevent the engagement of the first clutch 3 taking more time than necessary.

Furthermore, in the first embodiment, an example was shown in which the hybrid vehicle control device of the present invention is applied to an FF hybrid vehicle. However, the control device of the present invention is not limited to an FF hybrid vehicle, and may be applied to an FR hybrid vehicle, a 4WD hybrid vehicle, and a plug-in hybrid vehicle as well. In short, the invention may be applied to any hybrid vehicle.

In addition, an example was shown in which the automatic transmission is a belt type continuously variable transmission, but the invention is not limited thereto, and the automatic transmission may be a stepped automatic transmission. At this time, a clutch and brake provided inside the transmission may be used as the second clutch.

The invention claimed is:

1. A hybrid vehicle control device for controlling a drive system including an engine, a motor coupled to the engine via a first clutch, and an automatic transmission, the hybrid vehicle control device comprising:
  a controller programmed to, upon receiving a mode switch request during the electric vehicle traveling mode, engage the first clutch and shift from an electric vehicle traveling mode where only the motor is a drive source to a hybrid vehicle traveling mode where the engine and the motor are drive sources;
  the controller being further programmed to immediately start a mode switch control, which shifts from the electric vehicle traveling mode to the hybrid vehicle traveling mode by engaging the first clutch and starting the engine, and start a downshift control once a rotational speed of the engine has reached a combustion possible rotational speed, upon generation of both the mode switch request and a downshift request of the automatic transmission,
  the controller being further programmed to comprise a transmission speed control section which sets a transmission speed during the downshift control to be faster than the transmission speed during the downshift control when only a downshift request of the automatic transmission is generated.

2. The hybrid vehicle control device according to claim 1, wherein
  the transmission speed control section is programmed to increase the transmission speed during the downshift control as a required driving force of the driver is increased.

3. The hybrid vehicle control device according to claim 1, comprising:
  a timer that detects a stopped time of the engine before the mode switch control is started, wherein
  the transmission speed control section is programmed to decrease the transmission speed during the downshift control when the stopped time of the engine is shorter than a predetermined time as compared to the transmission speed during the downshift control when the stopped time of the engine is longer than the predetermined time.

4. The hybrid vehicle control device according to claim 1, comprising:
  a vehicle speed sensor that detects the vehicle speed, wherein
  the transmission speed control section is programmed to decrease the transmission speed during the downshift control as the vehicle speed is increased.

5. The hybrid vehicle control device according to claim 3, wherein
  the transmission speed control section is programmed to increase the transmission speed during the downshift control after the first clutch is engaged as compared to the transmission speed during the downshift control before the first clutch is engaged.

6. The hybrid vehicle control device according to claim 1, comprising:
  an accelerator position opening amount sensor that detects an accelerator position opening amount,
  the transmission speed control section being programmed to decrease the transmission speed during the downshift control, upon determining that the accelerator position opening amount is at less than a predetermined opening amount and an accelerator depression speed is less than a predetermined accelerator depression speed, as compared to the transmission speed during a downshift control when only the downshift request of the automatic transmission has been generated.

7. The hybrid vehicle control device according to claim 2, comprising:
  a timer that detects a stopped time of the engine before the mode switch control is started, wherein
  the transmission speed control section is programmed to decrease the transmission speed during the downshift control when the stopped time of the engine is shorter than a predetermined time as compared to the transmission speed during the downshift control when the stopped time of the engine is longer than the predetermined time.

8. The hybrid vehicle control device according to claim 2, comprising a vehicle speed sensor that detects the vehicle speed, wherein the transmission speed control section is programmed to decrease the transmission speed during the downshift control as the vehicle speed is increased.

9. The hybrid vehicle control device according to claim 4, wherein the transmission speed control section is programmed to increase the transmission speed during the downshift control after the first clutch is engaged as compared to the transmission speed during the downshift control before the first clutch is engaged.

10. The hybrid vehicle control device according to claim 2, comprising an accelerator position opening amount sensor that detects an accelerator position opening amount, the transmission speed control section being programmed to decrease the transmission speed during the downshift control, upon determining that the accelerator position opening amount is at less than a predetermined opening amount and an accelerator depression speed is less than a predetermined accelerator depression speed, as compared to the transmission speed during a downshift control when only the downshift request of the automatic transmission has been generated.

11. The hybrid vehicle control device according to claim 3, comprising a vehicle speed sensor that detects the vehicle speed, wherein the transmission speed control section is programmed to decrease the transmission speed during the downshift control as the vehicle speed is increased.

12. The hybrid vehicle control device according to claim 11, wherein the transmission speed control section is programmed to increase the transmission speed during the downshift control after the first clutch is engaged as compared to the transmission speed during the downshift control before the first clutch is engaged.

13. The hybrid vehicle control device according to claim 12, comprising an accelerator position opening amount sensor that detects an accelerator position opening amount, the transmission speed control section being programmed to decrease the transmission speed during the downshift control, upon determining that the accelerator position opening amount is at less than a predetermined opening amount and an accelerator depression speed is less than a predetermined accelerator depression speed, as compared to the transmission speed during a downshift control when only the downshift request of the automatic transmission has been generated.

14. The hybrid vehicle control device according to claim 3, comprising an accelerator position opening amount sensor that detects an accelerator position opening amount, the transmission speed control section being programmed to decrease the transmission speed during the downshift control, upon determining that the accelerator position opening amount is at less than a predetermined opening amount and an accelerator depression speed is less than a predetermined accelerator depression speed, as compared to the transmission speed during a downshift control when only the downshift request of the automatic transmission has been generated.

15. The hybrid vehicle control device according to claim 4, comprising an accelerator position opening amount sensor that detects an accelerator position opening amount, the transmission speed control section being programmed to decrease the transmission speed during the downshift control, upon determining that the accelerator position opening amount is at less than a predetermined opening amount and an accelerator depression speed is less than a predetermined accelerator depression speed, as compared to the transmission speed during a downshift control when only the downshift request of the automatic transmission has been generated.

16. The hybrid vehicle control device according to claim 5, comprising an accelerator position opening amount sensor that detects an accelerator position opening amount, the transmission speed control section being programmed to decrease the transmission speed during the downshift control, upon determining that the accelerator position opening amount is at less than a predetermined opening amount and an accelerator depression speed is less than a predetermined accelerator depression speed, as compared to the transmission speed during a downshift control when only the downshift request of the automatic transmission has been generated.

* * * * *